United States Patent [19]
Fehseke

[11] 3,889,973
[45] June 17, 1975

[54] OPPOSITE SIDE CENTERING AND HOLD-DOWN TRAILER UPRIGHTS

[76] Inventor: Richard L. Fehseke, 621 1/2 Seventh St., Fort Madison, Iowa 52627

[22] Filed: Nov. 8, 1973

[21] Appl. No.: 414,136

[52] U.S. Cl...... 280/179 A; 105/369 A; 248/361 A; 280/414 A
[51] Int. Cl............................................. B62d 3/10
[58] Field of Search........ 280/179 R, 179 A, 414 A; 105/369 A; 248/361 A, 361 R

[56] References Cited
UNITED STATES PATENTS

| | | | |
|---|---|---|---|
| 2,770,470 | 11/1956 | Halverson | 280/179 A |
| 2,895,705 | 7/1959 | Maham | 248/361 |
| 2,998,625 | 9/1961 | Huber | 248/361 A X |
| 3,011,818 | 12/1961 | Matthiessen | 248/361 X |

FOREIGN PATENTS OR APPLICATIONS

| | | | |
|---|---|---|---|
| 1,558,663 | 2/1969 | France | 280/414 R |

*Primary Examiner*—Kenneth H. Betts
*Assistant Examiner*—Michael J. Forman
*Attorney, Agent, or Firm*—Clarence A. O'Brien; Harvey B. Jacobson

[57] ABSTRACT

A pair of opposite side arm assemblies are provided for a trailer and each arm assembly includes first and second arm structures. Each of the arm structures includes a pair of relatively telescopable arm members having coacting structure for releasably securing the arm members in predetermined relatively extended and retracted positions. One pair of ends of each pair of first and second arm structures includes coacting structure pivotally securing the arm structures together for relative angular displacement and retaining the first and second arm structures in predetermined relatively angularly displaced positions. The free end of one of the arm structures of each pair of first and second arm structures includes an anchor to which one end of a tie-down strap may be secured and the free end of the other arm structure of each pair of first and second arm structures is pivotally attached to a mounting bracket suitable for mounting on the corresponding side of the trailer and the structure by which the other arm structure is secured to the mounting bracket may also be utilized to secure the other arm structure in predetermined angularly displaced positions relative to the mounting bracket, the axis of rotation of the other arm structure relative to the mounting bracket paralleling the axis of relative rotation between the first and second arm structures.

10 Claims, 7 Drawing Figures

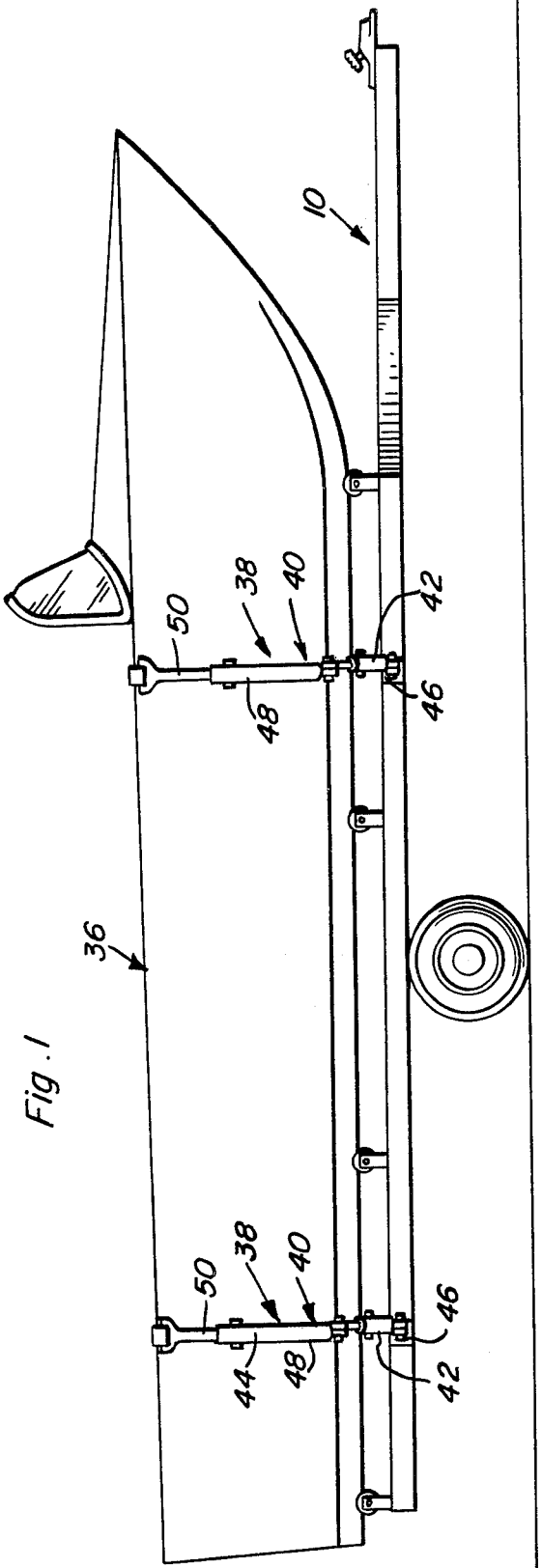
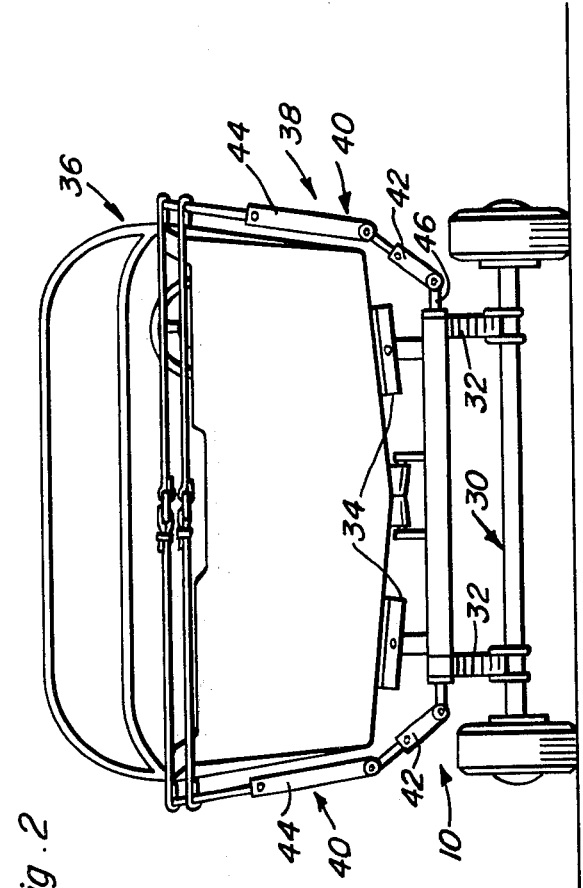
Fig. 1
Fig. 2

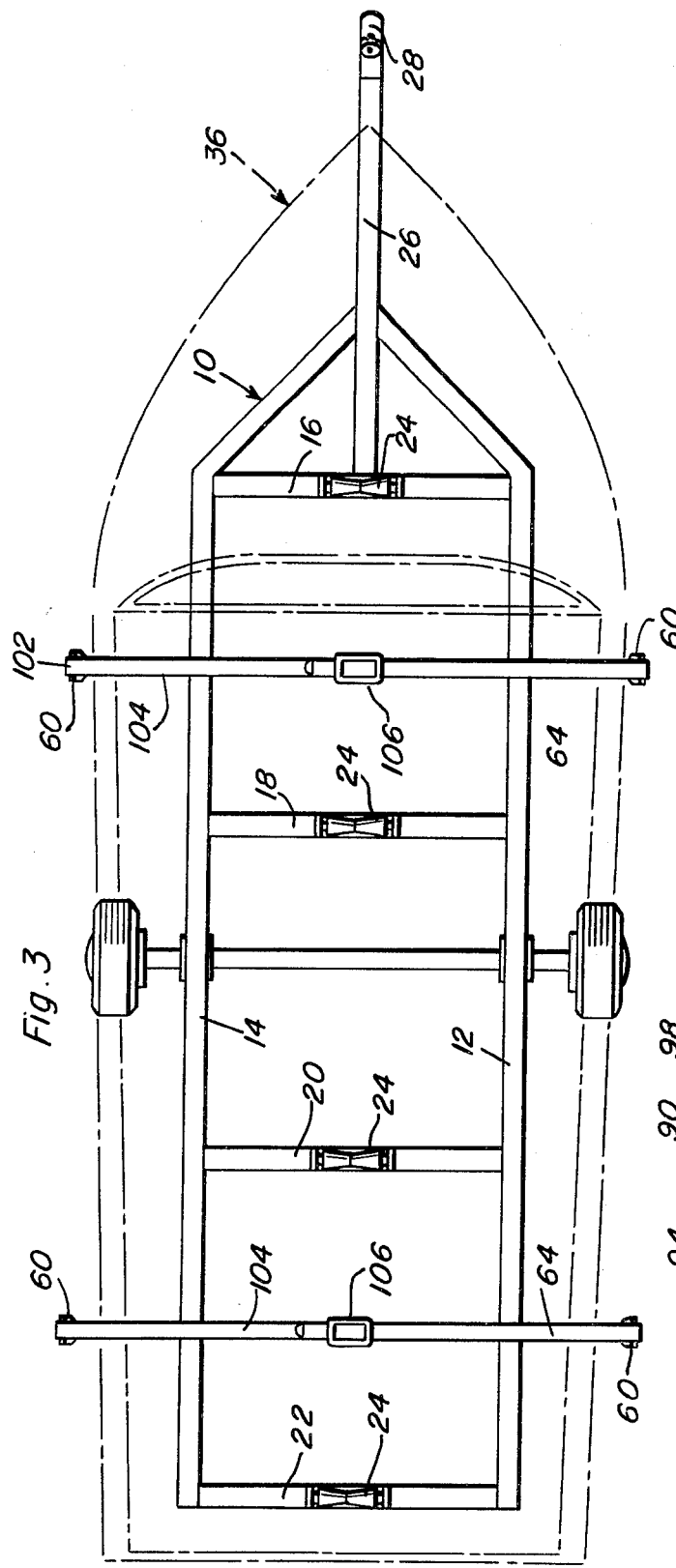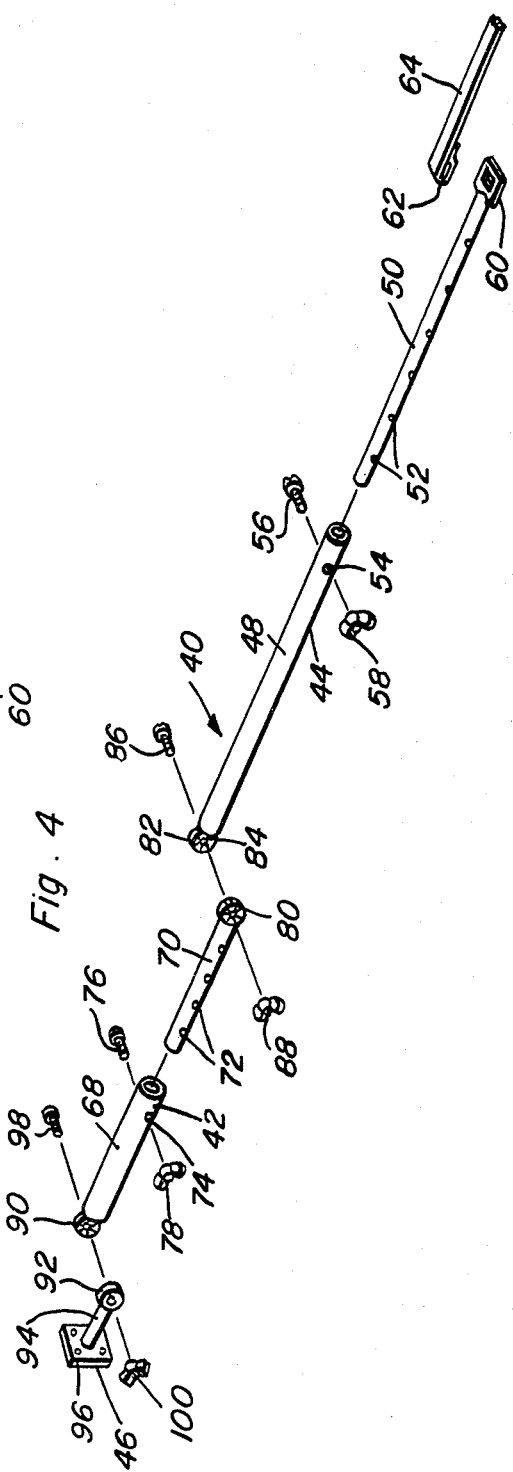

OPPOSITE SIDE CENTERING AND HOLD-DOWN TRAILER UPRIGHTS

SUMMARY OF THE INVENTION

Many lightweight trailers are utilized to carry various types of bulk loads while other lightweight trailers are utilized to transport boats. These lightweight trailers are, in most instances, completely devoid of structure by which the load, either a bulk load or a boat, may be properly centered on the trailer and many trailers are not equipped with structure by which bulk loads or a boat may be conveniently anchored thereto.

It is accordingly the main object of this invention to provide a combined load centering and hold-down structure for trailers which will serve the dual function of centering a load on a trailer and providing a means by which the load, after being placed on the trailer, may be secured thereto against shifting thereon.

Another object of this invention, in accordance with the immediately preceding object, is to provide an apparatus which may be readily adapted for use on trailers of different manufacture as an after market attachment and which may also be readily incorporated into trailers presently being manufactured.

Yet another object of this invention is to provide an apparatus in accordance with the preceding objects and which may be readily adjusted to compensate for different size and shapes of bulk loads and boats to be carried on a trailer.

A final object of this invention to be specifically enumerated herein is to provide an apparatus which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a conventional form of boat trailer utilizing the load centering and hold-down structure of the instant invention;

FIG. 2 is an end elevational view of the assemblage illustrated in FIG. 1 as seen from the left side thereof;

FIG. 3 is a top plan view of the assemblage illustrated in FIG. 1, but with the boat illustrated in phantom lines;

FIG. 4 is an exploded perspective view of one of the arm structures of the instant invention;

Figure 6:
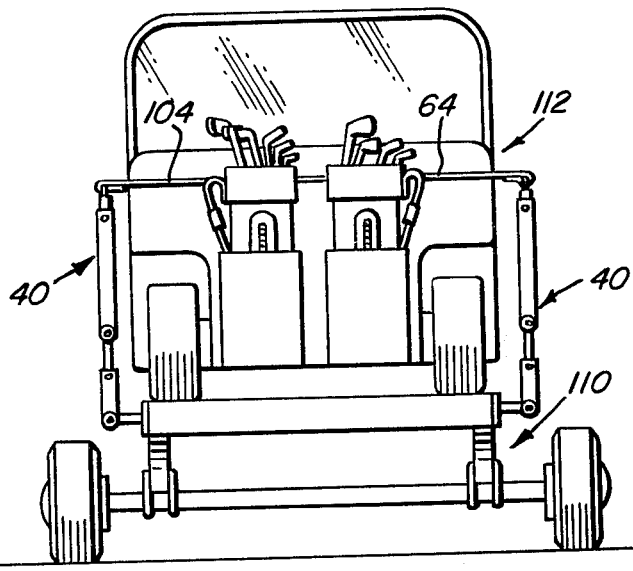
Figure 7:
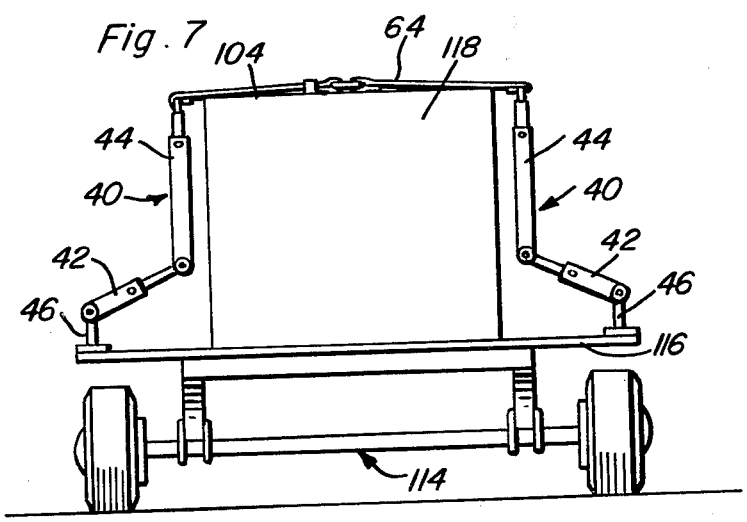

FIG. 6 is a rear elevational view of a similar but modified form of trailer provided with a flooring, having a golf cart loaded thereon and with the load centering and hold-down structure of the instant invention being utilized to secure the golf cart in position on the trailer; and FIG. 7 is a rear elevational view of a second modified form of trailer illustrating the manner in which the load centering and hold-down structure of the instant invention may be utilized to secure a bulk load in position thereon.

Referring now more specifically to the drawings, the numeral 10 generally designates a conventional boat trailer including opposite side longitudinal frame members 12 and 14 interconnected at points spaced longitudinally therealong by transverse members 16, 18, 20 and 22 having central rollers 24 journaled therefrom for the support of the keel portion of a boat. The boat trailer 10 further includes a forwardly projecting tongue 26 equipped at its forward end with a trailer hitch 28 of conventional design. Also, from FIG. 2 of the drawings, it may be seen that the trailer 10 includes an axle assembly generally referred to by the reference numeral 30 supported from the longitudinal frame members 12 and 14 by means of conventional leaf spring assemblies 32. Also, the boat trailer 10 may include pivotally supported opposite side chocks or bunks 34 spaced longitudinally therealong, if desired.

A conventional form of run-about type boat is referred to in general by the reference numeral 36 and is disposed on the trailer 10.

The load or boat centering and hold-down construction of the instant invention is referred to in general by the reference numeral 38 and includes a pair of opposite side arm assemblies each referred to in general by the reference numeral 40. Each arm assembly includes first and second arm structures 42 and 44 and a mount or mounting bracket 46, see FIG. 2.

With attention now invited more specifically to FIG. 4 of the drawings, it may be seen that each arm structure 44 includes a first tubular arm member 48 and a second tubular arm member 50 having one end which is removably telescoped in a first end of the arm member 48. The arm member 50 is provided with longitudinally spaced transverse bores 52 and each arm member 48 is provided with a transverse bore 54 with which one of the transverse bores 52 may be aligned when the arm member 50 is telescoped into the arm member 48. After the arm member 50 has been telescoped into the arm member 48 with one of the bores 52 registered with the bore 54, a headed bolt 56 has its threaded shank portion passed through the aligned bores 52 and 54 and secured therethrough by means of a wing nut 58. Further, the free end of the arm member 50 is fashioned into a flat eye 60 with which the looped end 62 of a first strap member 64 is secured.

The arm structure 42 includes a similar but shorter tubular arm member 68 and an arm member 70. The arm member 70 includes a plurality of longitudinally spaced bores 72 and the arm member 68 includes a transverse bore 74. The arm member 70 is telescopingly receivable within the arm member 68 and one of the bores 72 may be aligned with the bore 74. Then, the threaded shank portion 76 of a bolt is passed through the aligned bores 72 and 74 and secured therethrough by means of a threaded wing nut 78. In addition, the free end of the arm member 70 has an eye portion 80 formed thereon and the free end of the arm member 48 has a similar eye portion 82 formed thereon. The eye members 80 and 82 are positionable in side by side registered position and the adjacent sides thereof are provided with radially extending interengageable teeth 84 to prevent relative rotation when the eye members 80 and 82 are clamped together. Thereafter, the threaded shank portion 86 of a bolt is passed through the eye members 80 and 82 and secured therethrough by means of a threaded wing nut 88.

Also, each arm assembly 40 includes an eye member 90 on the free end of each arm member 68 which is registrable with a corresponding eye member 92 carried by the shank portion 94 of the corresponding mounting bracket 46 which projects outwardly from the center of an apertured mounting plate portion 96 of the mounting bracket. The mounting plate portion 96 may, of course, be secured to any appropriate side portion of the trailer 10. Further, the threaded shank portion 98 of a bolt is passed through the registered eyes 90 and 92 and secured therethrough by means of a threaded thumb nut 100.

In operation, a pair of arm assemblies are secured, by means of the mounting brackets 46, to opposite side rear portions of the trailer 10 and a second pair of arm assemblies 40 are secured to opposite side forward portions of the trailer 10. The flat eye portion 60 on one side of the trailer 10 has the loop end 62 of the strap 64 secured thereto and the flat eye portion on the other side of the trailer 10 has a corresponding loop end 102 of a strap member 104 secured thereto, the free end of the strap member 104 being provided with a buckle 106 with which the free end of the strap member 64 is engageable. Then, the arm structures 44 and 42 may be properly angularly adjusted relative to the arm structure 42 and the corresponding shank portion 94 of the associated mounting bracket 46 so that the arm assemblies 40 may embracingly engage the boat 36 in the manner illustrated in FIG. 2 of the drawings. Then, after the boat 36 has been positioned on the trailer 10 between the two pairs of arm assemblies 40, the pairs of straps 64 and 104 may be secured together in order to secure the boat 36 on the trailer 10.

Figure 5:
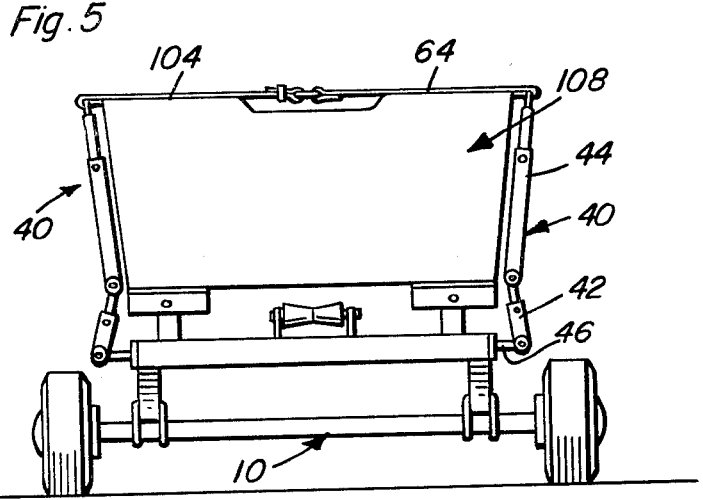
FIG. 5 is a rear elevational view illustrating the manner in which the instant invention may be adjusted to accommodate a boat of a different size mounted on the same trailer illustrated in FIG. 2.

With attention now invited more specifically to FIG. 5 of the drawings, there may be seen a second boat referred to in general by the reference numeral 108 supported from the trailer 10. The arm assemblies 40 have the arm structures 42 and 44 adjusted relative to the mounting bracket 46 and the arm structure 42 in order that the arm assemblies 40 may conform to the cross-sectional shape of the boat 108. Then, the strap members 64 and 104 are secured together in order to anchor the boat 108 to the trailer 10.

In FIG. 6 of the drawings, there is illustrated a modified form of boat trailer referred to in general by the reference numeral 110 and which has a golf cart referred to in general by the reference numeral 112 loaded thereon. The arm assemblies 40 are again adjusted differently according to the cross-sectional shape of the golf cart 112 and the straps 64 and 104 are secured together after adjustment of the arm assemblies 40 subsequent to the golf cart 112 being mounted on the trailer 110.

Finally, with reference to FIG. 7 of the drawings, there may be seen another form of trailer referred to in general by the reference numeral 114. The trailer 114 includes a wide flooring 116 to which the mounting beackets 46 of the arm assemblies 40 are secured. Here again, the arm structures 44 and 42 are adjusted relative to the arm structures 42 and the mounting brackets 46 in order to conform to the cross-sectional shape of the bulk load 118 disposed on the flooring 116 and the straps 64 and 104 are secured together over the bulk load 118.

When the arm assemblies 40 are adjusted in the manner illustrated in FIGS. 2 and 5 of the drawings, they not only serve as anchor members for the remote ends of the straps 64 and 104, but also serve as side stakes for centering the boats 36 and 108 on the trailer 10 as the boats are being moved longitudinally onto the trailers. Of course, the relative angular adjustment of the arm assemblies 42 relative to the mounting brackets 46 and adjustment of the arm structures 44 relative to the arm structures 42 as well as the extendible capabilities of the arm structures 42 and 44 enable the arm assemblies 44 to be tailored to the shape of the load to be supported from the associated trailer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated trailer including opposite side portions extending longitudinally of the trailer, a load centering device for said trailer, said device including a pair of opposite side arm assemblies, each of said arm assemblies including a pair of first and second arm structures including one pair of adjacent ends and means pivotally securing said adjacent ends together for adjustable relative angular displacement of said arm structures about an axis extending transversely of said arm structures, means carried by one end of each arm assembly defining an anchor location for a tension member, a pair of mounting brackets carried by corresponding opposite side portions of said trailer, the other end of each arm assembly being pivotally supported from a corresponding mounting bracket for adjustable angular displacement relative to the mounting bracket about an axis substantially paralleling the first mentioned axis and extending longitudinally of said trailer.

2. The combination of claim 1 wherein at least one of said arm structures includes means for adjustably varying its effective length.

3. The combination of claim 1 wherein each of said arm structures include means for adjustably varying its effective length.

4. The combination of claim 1 wherein each of said arm structures comprises a pair of relatively telescoped arm members including coacting means for releasably retaining said arm members in selected predetermined relatively telescoped positions.

5. The combination of claim 1 wherein said means pivotally securing each pair of said adjacent ends of said arm structures together includes overlapped adjacent end portions of said arm structures and a clamp type pivot fastener secured through said overlapped end portions.

6. The combination of claim 1 wherein said mounting brackets include base portions secured to the corresponding sides of a trailer and shank portions projecting outwardly from said base portions, the other ends of said arm assemblies being pivotally supported from the free ends of said shank portions.

7. The combination of claim 1 wherein said trailer comprises a boat trailer.

8. The combination of claim 1 wherein said trailer includes a generally horizontal load deck.

9. The combination of claim 1 including elongated, flexible and adjustable length tension member means anchored to and extending between said anchor locations.

10. The combination of claim 1 wherein said load centering device includes a plurality of pairs of said opposite side arm assemblies supported from corresponding opposite side portions of said trailer at points spaced longitudinally therealong.

\* \* \* \* \*